Nov. 14, 1939. H. A. INGALLS Re. 21,262

ROAD CONSTRUCTION

Original Filed March 13, 1933 2 Sheets-Sheet 1

INVENTOR.
HENRY A. INGALLS
BY
Munn, Anderson, Stanley, Foster & Liddy
ATTORNEYS.

Nov. 14, 1939. H. A. INGALLS Re. 21,262

ROAD CONSTRUCTION

Original Filed March 13, 1933 2 Sheets-Sheet 2

INVENTOR.
HENRY A. INGALLS
BY
Munn, Anderson, Stanley, Foster & Liddy
ATTORNEYS.

Reissued Nov. 14, 1939

Re. 21,262

UNITED STATES PATENT OFFICE 21,262

ROAD CONSTRUCTION

Henry A. Ingalls, Bakersfield, Calif., assignor to Helen Ingalls Crowder (sometimes known as Helen Elaine Crowder), Bakersfield, Calif.

Original No. 2,012,566, dated August 27, 1935, Serial No. 660,595, March 13, 1933. Application for reissue August 9, 1937, Serial No. 158,231

8 Claims. (Cl. 94—23)

My invention relates to road or paving construction. I have discovered that soil may be very readily treated at its situs and converted into a condition where it may be readily made into a smooth, strong, durable and inexpensive road surface when properly combined with other comparatively inexpensive constituents, such, for instance, as water and viscous fluids, such as crude oil. I of course do not claim broadly the method of constructing roads by the mere use of crude oil and soil, but I do claim, among other novel features, to be hereinafter set forth, to have discovered that by first treating the soil to reduce same to a loose, finely divided mass, then impregnating same under proper conditions with a sufficient quantity of water, I am able to so condition or prime same, that when crude oil is incorporated therewith, the oil will be effectively incorporated in the soil in a manner that will cause maximum benefit to be derived from use thereof, after the road has been fully constructed.

My invention therefore has for one of its objects the treatment of the soil to first render same sufficiently moist that after oil is initially incorporated therewith at the situs of the soil, the oil may thereafter be distributed to positions in the mass where it will function to securely bond together the particles of soil and produce at the upper stratum of the soil, and in the immediate vicinity thereof, a very smooth, strong and durable traffic surface which will be far less porous than was possible heretofore with prior methods. I am further able to utilize much smaller quantities of oil, and at the same time produce a finished product which will not dry out or disintegrate prematurely, and one which will better resist the effect of the elements and satisfactorily withstand the effect of heavy loads imposed thereon.

A further object of the invention resides in the provision of a novel method of constructing roads wherein provision is made for the work being carried on continuously.

A still further object of the invention is to provide a method of constructing roads wherein the crude oil which I cause to be deposited at predetermined positions therein may be promptly subjected to the action of steam or a blast of heated air so that the oil will be atomized thereby and forced in an upward direction through the loose particles of soil, whereby to cause the said particles of soil to be thoroughly saturated with oil.

A still further object of the invention is to provide a method of the character set forth wherein precalculated or definitely controlled portions of oil may be satisfactorily used to effect proper impregnation of the loose particles of soil with the oil.

Another object of the invention is to provide in paving or road construction a road surface having an inexpensive but strong and durable portion which will provide a lane over which light traffic may be handled and a similarly constructed, but somewhat modified portion serving as a lane for the handling of heavy traffic.

A very important object of the invention is to provide a road, the bed of which will be characterized in the manner aforestated in conjunction with which said bed is employed a novel slab surface which will freely adapt itself to variations in temperature without resulting in injury to said surface.

My invention is illustrated in the accompanying drawings, in which

In preparing the soil, I first reduce same to a finely divided state which may be subsequently condensed into a substantially homogeneous dense mass when uniformly subjected to the action of suitable external condensing pressures, preferably pressures of a progressively increasing nature, such as may be brought about by an initial application of a light weight roller thereto, followed by similar uniform applications of rollers of gradually increasing weights. After the soil has been turned and made light, all large foreign particles, stones and the like, are preferably removed therefrom so that no large voids will remain in the mass through which oil might find egress to the subsoil or to levels or places beyond the effective zone of the soil under treatment.

Figure 1:
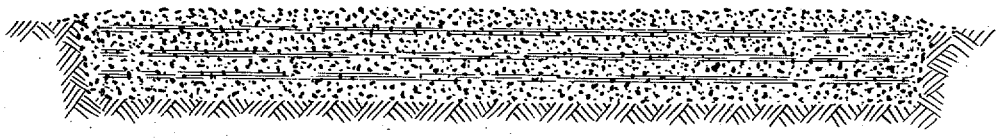
Figure 1 is a view in transverse section showing the condition of the pre-moistened soil and the application thereto of crude oil to effect stratification of the oil preparatory to an application of a condensing pressure to the mass.

I then again tumble and thoroughly agitate the soil, this time in the presence of water, so that the mass will be fairly moist. In Figure 1 of the accompanying drawings, I have illustrated as well as possible the condition of the soil after same has been reduced to a finely divided state, saturated with water and supplied with crude oil. Best results may be obtained by application of the oil so as to stratify same, so to speak, relatively to adjacent layers of moist soil.

Figure 5:
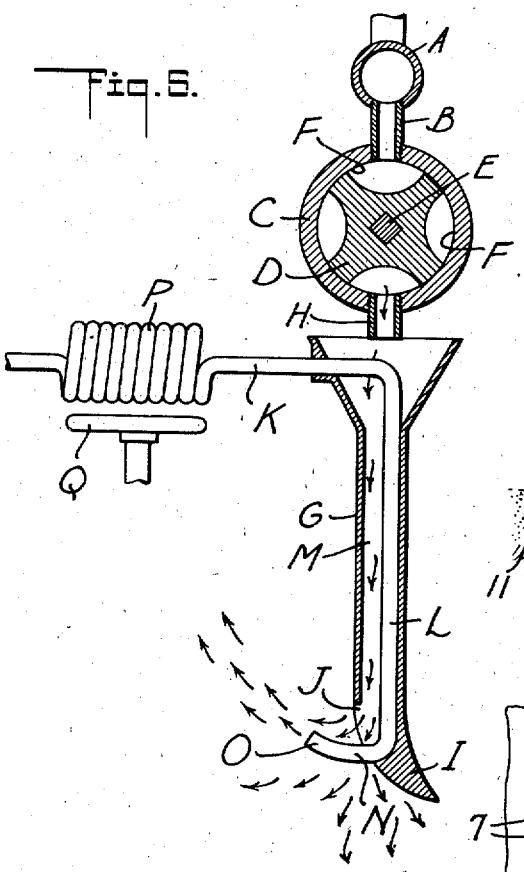
Figure 5 is a vertical section through the oil distributing means.

I have previously indicated a desire to so apply the oil that it will be stratified in the mass of soil under treatment. I very nicely accomplish this object by the use of the distributing mechanism shown in Figure 5. This mechanism comprises a manifold A into which the crude oil may be conducted from any suitable source of supply (not shown) and then led from the manifold through the pipe B into a valve chamber C. The valve chamber may be sub-divided into as many sections as are desired, and in each section is a rotary valve D, which acts in conjunction with the valve chamber to cause controlled or predetermined quantities of oil to be discharged from the chamber as the valve is rotated. The valve is therefore mounted upon a driven shaft E into which power can be taken in any suitable well known manner, whereby to revolve the valve, preferably at a comparatively slow speed. The said valve is divided into a plurality of peripheral pockets F, each functioning to accommodate a predetermined measure of oil. For each section of the valve chamber C is employed a vertical distributor G, the upper end of which is of funnel formation and arranged with its large end directly beneath the discharge nipple H of the particular valve section of the chamber C with which it is intended to coact. The lower end of the vertical distributor is formed at its front end with a soil penetrating blade or portion I and immediately at the rear of said portion I the walls of the distributor are formed with an oil discharge opening J, from which the oil may be discharged in a downward and rearward direction. At K is illustrated a blast tube, the same being extended into a funnel-like end of the distributor G, and, as illustrated, it is formed with a vertical leg L which extends through the bore of said distributor. This leg L of the blast tube K is preferably eccentrically positioned with relation to the annular walls of the distributor so that a duct M is formed between said walls and said leg for the free downward passage therethrough of the oil, as will be appreciated. The lower end of the leg L is provided with a rearwardly extending nozzle N, whose free extremity is preferably curved slightly in an upward direction, as at O. The blast tube may be connected in a source of air supply, and it is desired that said tube be provided with a circulating coil P, which is adapted to be heated by a burner Q. It is in this manner that air under pressure, as it is being conducted to the leg L, will be heated, whereby to enable the oil to freely flow through the duct M and to discharge from the orifice J. Now it follows that when the heated air is discharged from the curved end O of the nozzle N, blasts of air will be made to impinge against the soil, so as to induce a suction at the rear of the orifice J, and thereby accelerate the movement of the oil out of the orifice, while producing an upward current of warm air which effectually functions to atomize the oil and to force same in an upward direction through the loose particles of soil. It is in this manner that I provide for proper impregnation of the particles of soil with oil, and the action is so complete that when employed in conjunction with a measuring scheme or system for discharging controlled or definitely limited portions of oil to the distributor G, a material saving in the use of oil is effected. Instead of discharging air into the blast tube K, steam may, of course, be used as a substitute therefor.

After the oil has been applied to the premoistened soil, as aforestated, a road grader is passed thereover and the mass leveled; I then apply condensing pressures to the mass over such period of time and by the use of rollers or the like of progressively increasing weights and by compacting same until the mass has been densely packed and reduced to a homogeneous condition. It is largely in this manner that I provide for very complete distribution of the oil through the entire mass of soil, without undue loss of oil. I am also able to confine the oil to the effective area formed by the mass under treatment. Due to the existence of a moisture content in the soil, I am able to produce a road, the top stratum of which is exceedingly smooth and well sealed off by the oil, as the tendency of the moisture contained in the soil is to raise the oil to levels within the mass of soil, where full benefit will be derived therefrom. Any inequalities in the surface are, of course, readily leveled off by compacting same during the early development period, and, if desired, oil or water may be sprayed or otherwise applied to the surface to additionally seal off any and all pores contained therein and to allay dust.

Figure 2:
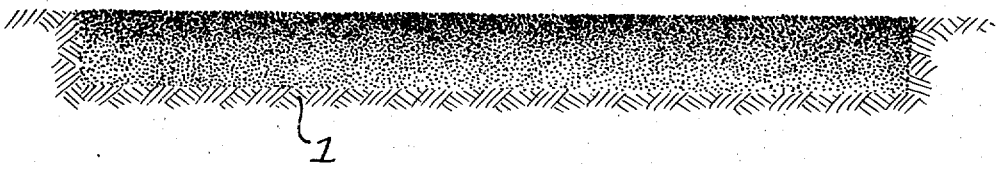
Figure 2 is a view similar to Figure 1, showing the mass fully condensed or compressed.
Figure 3:
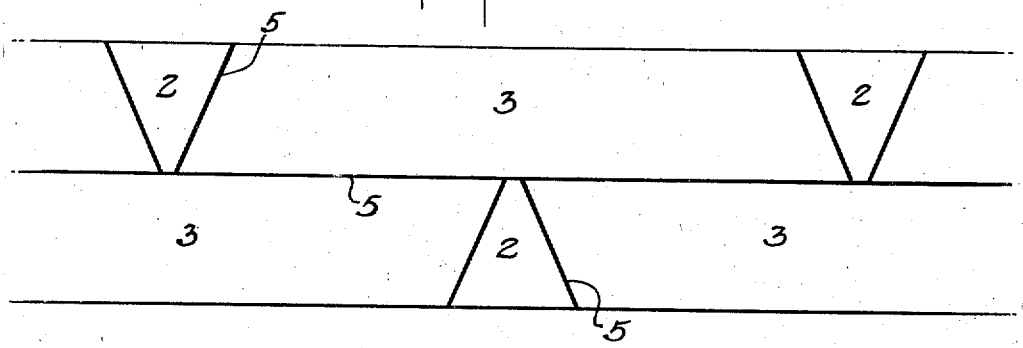
Figure 3 is a view in plan view of the road when provided with my improved slab construction.
Figure 4:
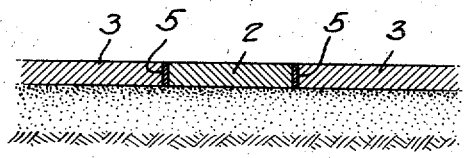
Figure 4 is a longitudinal section through a portion of a completed roadway constructed in accordance with one embodiment of the invention.

A road constructed as aforementioned is more or less yieldable, and same furnishes a uniform support for a cement or other suitable overlying hard surface, as shown in Figures 3 and 4. Suitable forms, not shown, may be placed upon the finished, densely packed underlying bed 1 (Figure 2) and cement poured therein so as to produce wedge or substantially wedge or key-stone shaped laterally movable slabs 2, and somewhat similar but considerably longer slabs 3, of approximately 100 foot lengths. When the forms are removed from around the respective slabs thus formed, grooves 5 are left between the complementing edges of the adjoining slabs, and these joints are then filled in with tar, asphaltum, pitch or other suitable well known substance which is more or less elastic and impermeable to water. By means of these elastic joints, taken with the fact that at least two faces of each of the slabs 2 and 3 are flared, in opposite directions, as clearly shown in Figure 3 of the drawings, it follows that effective expansion joints are formed therebetween so that said hard surface will readily adapt itself to variations in temperature without resulting in injury to said surface.

The method herein described is such that I am able to take advantage of known natural laws, in a desire to place an essential constituent, namely, crude oil or the like, in a condition of more or less stable equilibrium, so to speak, when associated with a liquid of different density, such as water, whereby to confine the oil wholly within the body or mass of soil, which latter is employed as a base material in the construction of my improved road. In other words, I am able to definitely superpose heterogeneous liquids (oil and water) with respect to each other so that the oil will be held in suspension in said mass of soil until displaced in the manner aforementioned. While I have described that the soil is first properly saturated with water and that, thereafter, the oil is applied by stratifying same with respect to layers of said soil, I do not mean to infer that I, in fact, constantly maintain relative superposed stratification of the oil in the mass of moist soil. It is my opinion that the relative portions of oil and water employed act upon each other so that the whole body of oil will remain pretty much suspended until the soil has been properly subjected to the action of the necessary external pressures. During the operation of condensing the mass of soil, the excess oil is displaced and same rises toward the upper stratum of the soil. It follows that, in time, much of the water contained in the soil goes off by natural evaporation, but before the soil becomes entirely dry, it is also manifest from the steps herein employed that the oil will have become a reliable homogeneous part thereof. It is because thereof that I am able to completely utilize the oil without oversaturation as an essential bonding and body-strengthening constituent in the production of an inexpensive road which will have many of the finer qualities of more expensive road constructions. A road bed, when constructed as herein described, affords a more or less uniform yieldable support for an expansible overlying hard surface, such as I have described and particularly illustrated in Figure 3 of the drawings. By perfectly sealing the joints between the aforestated slabs 2 and 3 with asphaltum, tar, pitch or other suitable well known compounds, and flowing the joint material onto the upper stratum of the underlying bed, premature deterioration of the said bed by contact with surface water is eliminated.

The aforementioned slabs 2 and 3 are arranged in longitudinal rows along the road thus constructed and each of said slabs may, of course, be of any suitable width and of such thickness as may be required to render same perfectly strong and durable. Their arrangement with respect to each other is such that they will readily respond to any and all forces applied thereto, as may be due to variation in temperature.

Figure 6:
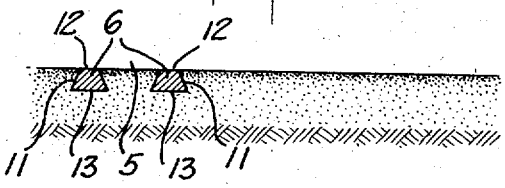
Figure 6 is a transverse section through a portion of a roadway showing a slightly modified form of the invention.
Figure 7:
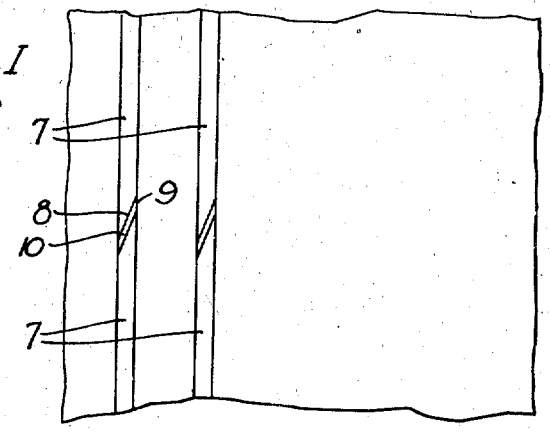
Figure 7 is a plan view of the modified construction shown in Figure 6.

In the form of the invention shown in Figures 6 and 7, a roadway very similar to the one described in Figures 1 to 3, inclusive, is provided, but in this form of the invention the roadway is of greater width than the first said form, whereby to provide an intermediate portion formed for handling light traffic and a portion or lane 5 for accommodating heavy traffic. While I have shown but one of said portions 5, it is to be understood that two thereof will be provided in practice, and disposed at the respective sides of the portion 3. In the said portion 5 I incorporate cement rails 6 which are arranged in parallelism with each other. These rails are constructed of cement and each thereof includes mating longitudinal sections 7, whose ends are mitered at 8 to provide the expansion joint 9 therebetween. These joints are then filled in with asphalt, pitch, tar or the like 10. Each rail section 7 is of dovetailed form in cross section, as shown in Figure 6, so as to provide downwardly and outwardly flaring sides 11, a flat upper surface 12 and a flat lower surface 13. These sections are embedded in the body of the pavement or roadway, as clearly shown in Figure 6. It is to be understood that these cement rails are to be properly spaced apart so that the wheels of an automobile may roll thereover and that the upper surfaces of the rails are of ample width to accommodate the tread surfaces of said wheels.

I would have it understood that as many layers of oil may be injected into the soil as may be found desirable or necessary according to the thickness of the mass of oil under treatment. In a road structure the thickness of which is to be six inches, I have found in practice that a single application of oil is sufficient when injected to a depth of approximately six inches from the upper surface. It has also been found that when the oil is distributed as aforementioned and the soil subsequently subjected to the action of external pressures, sometimes surplus oil appears upon the surface. When this condition presents itself, it is only necessary to spread over the surface containing said surplus oil sufficient quantity of suitable soil, preferably a soil which affords traction. A surprisingly small amount of oil may be satisfactorily used, and in the road constructed as aforementioned the structure was strong enough to sustain exceedingly heavy traffic, such as motor trucks which are now otherwise ordinarily barred from the highways.

What I claim and desire to secure by Letters Patent is:

1. The method of constructing roads including loosening top soil along a roadway to provide a pervious top layer above a relatively impervious roadbed of subsoil, mixing oil and water into the soil of the top layer in quantities to substantially saturate the soil with water and permeate the water saturated soil with oil, and effecting permeation of the water treated soil with the oil by compacting the top layer.

2. The method of constructing roads including reducing soil at its situs to a finely divided mass substantially free of voids of appreciable size, mixing oil and water with the finely divided soil in quantities to substantially saturate the soil with water and permeate the water saturated soil with oil, distributing the oil through the water treated soil so as to cause the oil to fill the voids therein, and densely packing the top layer so as to seal off the underlying bed of subsoil by application of condensing pressure to the surface of said top layer.

3. The herein described steps in the method of constructing roads comprising reducing soil at its situs to a finely divided state so that no voids of any appreciable size are left therein, mixing heterogeneous liquids with the soil, then applying a condensing pressure to the soil to densely pack same and to dispose the liquid of lighter density in suspension upon the liquid of heavier density so as to cause said liquid of lighter density to fill the voids in the upper stratum of the soil and to seal off said upper stratum from the underlying structure of the soil.

4. The herein described method of utilizing soil at its situs as a structural material in the building of roads comprising reducing the soil to a finely divided state, incorporating water in the soil in a manner to thoroughly moisten substantially all particles thereof, mixing a structural liquid with the soil, the density of which is less than water, then condensing the soil to effect upward displacement of the said structural liquid and the water with the structural liquid in flotation on the water and to cause same to become a homogeneous part of the soil at the upper stratum of the soil.

5. The herein described method of utilizing soil at its situs as a structural material in the building of roads comprising reducing the soil to a finely divided state, incorporating water in the soil in a manner to thoroughly moisten substantially all particles thereof, mixing a viscous structural liquid with the soil, the density of which is less than water, then condensing the soil to effect upward movement of said structural liquid and the water with the former in flotation on the water and to cause same to become a homogeneous part of the soil and to seal off the voids in the upper stratum of the soil.

6. The herein described method of constructing roads comprising dividing the soil while same is in situ to reduce same to a loose, more or less finely divided mass, incorporating water in the mass in a quantity to constitute an upwardly moving hydrostatic head when down pressure is applied to the upper surface of the mass, incorporating controlled portions of oil in the mass below the upper surface thereof, then applying a condensing pressure to the mass from the upper surface thereof to cause the water, when rising, to carry the oil vertically upwardly through the mass and thus gradually fill the voids in the mass and to seal off the upper surface of the mass to render same impervious to downward penetration of water into the mass.

7. The herein described method of constructing roads comprising dividing the soil while same is in situ to reduce same to a loose more or less finely divided mass, incorporating water in the mass in a quantity to constitute an upwardly moving hydrostatic head when down pressure is applied to the upper surface of the mass, incorporating controlled portions of oil in the mass below the upper surface thereof, then applying successively increasing condensing pressures to the mass from the upper surface thereof to thereby cause the water as it rises to carry the oil vertically upwardly through the mass and thus gradually fill the voids in the mass and to seal off the upper surface of the mass to render same impervious to downward penetration of water into the mass.

8. The herein described method of constructing roads comprising dividing the soil while same is in situ to reduce same to a loose, more or less finely divided mass, incorporating water in the mass in a quantity to constitute an upwardly moving hydrostatic head when down pressure is applied to the upper surface of the mass, incorporating controlled portions of oil in the mass below the upper surface and at different levels in the mass, then applying a condensing pressure to the mass from the upper surface thereof to cause the water, when rising, to carry the oil vertically upwardly through the mass and thus gradually fill the voids in the mass and to seal off the upper surface of the mass to render same impervious to downward penetration of water into the mass.

HENRY A. INGALLS.